Patented Feb. 15, 1927.

1,617,332

UNITED STATES PATENT OFFICE.

MAX HARTMANN AND MAX SEIBERTH, OF BASEL, SWITZERLAND, ASSIGNORS TO THE FIRM SOCIETY OF CHEMICAL INDUSTRY IN BASLE, OF BASEL, SWITZERLAND.

PROCESS FOR THE MANUFACTURE OF PYRIDINE-3-CARBOXYLIC ACID AMIDES.

No Drawing. Application filed December 11, 1925, Serial No. 74,891, and in Switzerland December 20, 1924.

In Patent 1,403,117 there is described a process for the manufacture of dialkylamides of nicotinic acid (pyridine-3-carboxylic acid) consisting in heating a halide of nicotinic acid with a salt of a dialkylamide for several hours at a temperature of 160°–180° C.

By the present invention pyridine-3-carboxylic acid amides, substituted in the amide group, may be obtained by causing a quinolinic acid anhydride to react with an amine, preferably of the formula

R R₁=a monovalent saturated or unsaturated hydrocarbon radical, e. g. alkyl, allyl, aralkyl, and converting the product of the reaction thus obtained, by heating it, into the corresponding pyridine-3-carboxylic acid amide. This latter is obtained in pure form by distillation, preferably under diminished pressure.

For example, when quinolinic acid anhydride is caused to react with diethylamine there is first produced the diethylamine salt of quinolinic diethylamic acid. This decomposes when heated into pyridine-3-carboxylic acid diethylamide, carbon dioxide and diethylamine. When elimination of carbon dioxide is finished the pyridine-3-carboxylic acid diethylamide may be distilled, preferably under diminished pressure.

The following formulæ may be presumed to represent the reaction:—

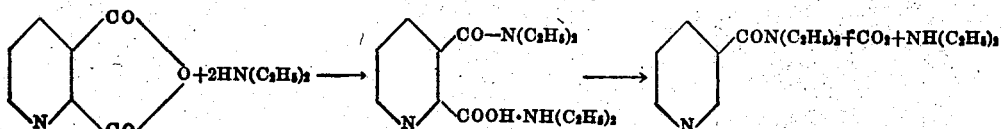

Instead of diethylamine another saturated or unsaturated secondary amine may be used, for instance dipropylamine, diamylamine, methylpropylamine, ethylpropylamine, diallylamine or piperidine.

The following example illustrates the invention.

1 part by weight of quinolinic acid anhydride is introduced into 3 parts of diethylamine. The mixture is boiled for 2 hours in a reflux apparatus and the excess of diethylamine is distilled. The residue is heated to 180° C. Carbon dioxide and diethylamine are evolved. When no more carbon dioxide is evolved the oily residue is distilled under diminished pressure, whereby the pyridine-3-carboxylic acid diethylamide described in Patent No. 1,403,117 passes over as a bright oil.

By substituting for the diethylamine in the foregoing example dipropylamine, diamylamine or piperidine, there is obtained respectively pyridine-3-carboxylic acid dipropylamide, pyridine-3-carboxylic acid diamylamide or pyridine-3-carboxylic acid piperidide, corresponding with the formulæ:

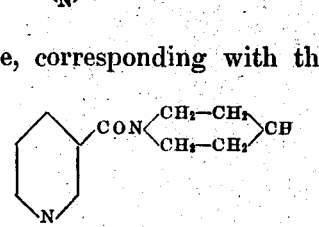

which are described in U. S. Patent No. 1,403,117 and in the Swiss Patent 91,104, respectively.

In the same manner N-disubstituted amides of nicotinic acid having unsaturated or mixed alkyl, or further aryl, or mixed aryl-alkyl residues are obtained, for instance—

Nicotinic acid diallylamide, corresponding with the formula:

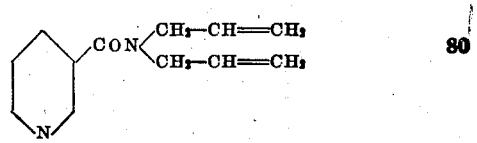

which is an oil soluble in water and boiling at 147° C. under 3 mm. pressure.

Nicotinic acid methylpropylamide, corresponding with the formula:

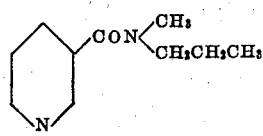

which is a yellowish oil easily soluble in water and boiling at 174° C. under 16 mm. pressure.

Nicotinic acid ethylpropylamide, which is also an oil soluble in water and boiling at 173° C. under 15 mm. pressure.

Nicotinic acid diphenylamide, corresponding with the formula:

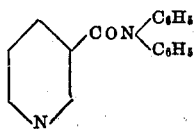

which forms colourless crystals, melting at 150°, and is easily soluble in dilute hydrochloric acid, somewhat soluble in boiling water, difficultly soluble in ether and benzene.

Nicotinic acid phenylethylamide, corresponding with the formula:

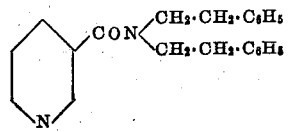

which forms a viscous oil, boiling at 270° C. under 7 mm. pressure, and is soluble in dilute hydrochloric acid, alcohol, ether and benzene, somewhat soluble in boiling water.

What we claim is:

1. A process for the manufacture of pyridine-3-carboxylic acid amides substituted in the amide group, by causing a quinolinic acid anhydride to react with a secondary amine, and then heating to eliminate carbon dioxide from the product of the reaction.

2. A process for the manufacture of pyridine-3-carboxylic acid amides substituted in the amide group, by causing a quinolinic acid anhydride to react with an amine of the formula

where R and $R_1$ represent a monovalent hydrocarbon radical, and then heating to eliminate carbon dioxide from the product of the reaction.

3. A process for the manufacture of N-dialkylamides of pyridine-3-carboxylic acid, by causing a quinolinic acid anhydride to react with a secondary amine of the formula

HN$<$R/$R_1$ where R and $R_1$ represent alkyl groups, and then heating to eliminate carbon dioxide from the product of the reaction.

4. A process for the manufacture of pyridine-3-carboxylic acid amides substituted in the amide group, by causing a quinolinic acid anhydride to react with a secondary amine, then heating to eliminate carbon dioxide from the product of the reaction and distilling the amide of pyridine-3-carboxylic acid thus formed.

5. A process for the manufacture of pyridine-3-carboxylic acid amides substituted in the amide group, by causing a quinolinic acid anhydride to react with an amine of the formula

where R and $R_1$ represent a monovalent hydrocarbon radical, then heating to eliminate carbon dioxide from the product of the reaction and distilling the amide of pyridine-3-carboxylic acid thus formed.

6. A process for the manufacture of N-dialkylamides of pyridine-3-carboxylic acid, by causing a quinolinic acid anhydride to react with a secondary amine of the formula

where R and $R_1$ represent alkyl groups, then heating to eliminate carbon dioxide from the product of the reaction and distilling the N-dialkylamide of pyridine-3-carboxylic acid thus formed.

7. A process for the manufacture of pyridine-3-carboxylic acid diethylamide, by causing quinolinic acid anhydride to react with diethylamine, and heating to eliminate carbon dioxide from the product of reaction.

8. A process for the manufacture of pyridine-3-carboxylic acid diethylamide, by causing quinolinic acid anhydride to react with diethylamine, heating to elminate carbon dioxide from the product of the reaction, and distilling the N-diethylamide of pyridine-3-carboxylic acid.

9. A process for the manufacture of pyridine-3-carboxylic acid diethylamide, by causing quinolinic acid anhydride to react with diethylamine, heating to eliminate carbon dioxide from the product of the reaction, and distilling the N-diethylamide of pyridine-3-carboxylic acid under diminished pressure.

In witness whereof we have hereunto signed our names, this 30th day of November, 1925.

MAX HARTMANN.
MAX SEIBERTH.